(12) United States Patent
Haas et al.

(10) Patent No.: US 7,032,096 B2
(45) Date of Patent: Apr. 18, 2006

(54) MEMORY MANAGEMENT SYSTEM AND METHOD USING A HASH TABLE

(75) Inventors: William Robert Haas, Fort Collins, CO (US); Kirk Steven Tecu, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 10/421,344

(22) Filed: Apr. 22, 2003

(65) Prior Publication Data

US 2004/0215920 A1   Oct. 28, 2004

(51) Int. Cl.
*G06F 12/00* (2006.01)

(52) U.S. Cl. ..................................... 711/216
(58) Field of Classification Search ................. 711/216
See application file for complete search history.

(56) References Cited

U.S. PATENT DOCUMENTS 5,742,807 A    4/1998  Masinter
5,948,062 A *  9/1999  Tzelnic et al. .............. 709/219
6,490,666 B1* 12/2002  Cabrera et al. ............. 711/161
6,928,526 B1*  8/2005  Zhu et al. ................... 711/154

OTHER PUBLICATIONS

Kyle Loudon, Mastering Algarithms with C, O'Reilly & Associates, 1st Ed. Aug. 1999, pp. 141-177.
Ron Burk, Hashing: from good to perfect, C Users Journal, Feb. 1992 v10 n2 p41(12), pp. 1-5.
Melissa J. Perenson, CD and MP3: A Match Made in Music Heaven, PC World, Apr. 2001 v19 i4, p70, pp. 1-5.
M. Nilsson, ID3 tag version 2.3.0, Informal standard, Feb. 3rd, 1999, pp. 1-41 http://www.id3.org/id3v2.3.0.html.
The Mac Observer—Canto Releases Enhancements For Cumulus, Jan. 16th, 2001, pp. 1-4.

\* cited by examiner

*Primary Examiner*—Hiep T Nguyen

(57) ABSTRACT

A memory management system and method includes, in one embodiment, an index location in a hash table that represents metadata, and a file memory address saved at the index location so that the hash table is searchable by a processor by entering the metadata into a hash function to transform the metadata into the index location where the memory address is stored.

13 Claims, 5 Drawing Sheets

MEMORY MANAGEMENT SYSTEM AND METHOD USING A HASH TABLE

BACKGROUND OF THE INVENTION

1. Field of the Invention

This invention relates to electronic systems, and more particularly to memory management systems and methods.

2. Description of the Related Art

Electronic devices which capture, create, store, manipulate and/or transfer digital music, sound, images, movies or other encoded data have become more prevalent with the advent of less-expensive semiconductor processing and increased consumer demand. Applications such as portable MP3 (Moving Picture Experts Group layer 3 standard) players, PDAs (electronic personal data assistants), digital cameras and digital voice recorders continue to gain popularity. The general trend for each of these electronic applications is to provide greater data storage capability at reduced cost.

Unfortunately, greater memory in these applications is accompanied by an increase in search time when a user attempts to locate a particular file. MP3 players may store hundreds of songs from potentially many different genres. Digital cameras may store hundreds of pictures capturing varied subject matter. Organizing and searching for a particular file is a time-consuming process.

Various types of hashing are used to organize and search for data. Open-address hashing can be used when each record has a single key for organizing. In this method, a hash function f(K) transforms the key into an index location in a hash table in which the record is to be saved. Kyle Loudon, *Mastering Algorithms with C* 141–142 (O'Reilly & Associates 1$^{st}$ ed.) (August 1999). The record may be found subsequently by re-entering the key into the hash function to find the record's index location. Extendible hashing, another form of hashing, uses the key to determine the portion of memory in which a filed is to be saved. In one example, a hash function is used in combination with a page table having pointers to disk pages. A disk page is a fixed-size portion of memory that may contain many database files. To determine which disk page to use for the file, the record's key is hashed and the most significant bit of the result is used to locate an index location in the page table. The index location points to a disk page where the file is then saved. (*See Hashing: from good to perfect*, Ron Burk, C Users Journal, 1992, p. 1). To search for the file later, the key is re-entered into the hash function to narrow the search to the particular disk page where the file was saved. Both of these hash methods, while useful for records and files having a single key, are not useful to organize data based on more than one key.

Microsoft® Windows® and Windows CE software, both offered by Microsoft Corporation, organize files by using user-selected alphanumeric names and nested folders which contain the files. A file may be located by searching for its name, or by doing a text search of each individual file. File types, such as word processing documents or executables, may also be used in combination with a file name and folder to help a user find a file. This process is less than optimal when large numbers of files must be searched for files having a particular characteristic or content.

Searching for files is sometimes aided by metadata in the files themselves. Metadata, as used herein, is a key word or words in a metadata field that is attached to the file in a header portion ("interface") and describes the file's contents. For example, MP3 files include metadata fields that are appended to the audio data. Some MP3 players include programming to enable browsing of MP3 file metadata that identifies track, album, artist, and/or genre as the file is played. See Melissa J. Perenson, *CD and MP3: A Match Made in Music Heaven*, PC World, April 2001 v19 i4, at 70. Other metadata fields are available that include metadata to identify composer, copyright owner, album/movie/show title, reverb content, equalization content, language, and beats per minute. Martin Nilsson, *ID3 Tag Version* 2.3.0, p. 1 (Feb. 3, 1999). Canto Software, Inc., offers a Cumulus MP3 Filter product for use on Windows® software to automatically catalog metadata from MP3 file types for later searching. Press Release, *Canto Releases Free Cumulus MP3 Filter*, Jan. 10, 2001, at 1. The catalog can be searched for title, artist, album, and year for MP3 file searching. Unfortunately, such cataloging greatly increases the amount of data stored in memory because the metadata is reproduced in the catalog.

SUMMARY OF THE INVENTION

There is still a need for a more user-friendly computer data management and search system. A memory management system and method comprises, in one embodiment of the invention, a hash table with an index location that represents metadata, and a file memory address saved at the index location. The hash table is searchable by a processor by entering metadata into a hash function to transform the metadata to the index location where the memory address is stored.

In another embodiment, a file having metadata in a metadata field is saved in a memory at a memory address, and the metadata is transformed into an index location in a hash table. The memory address for the file is saved at the index location. The hash table is searchable by the processor to locate the file in the memory.

In one embodiment, an indication is sent to a processor that a new file interface having a metadata field is available for a file type. The new file interface is sent to the processor, and the processor is configured to recognize files having the new file interface.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

DETAILED DESCRIPTION

A memory management system, in accordance with embodiments of the invention, includes a hash table having an index of hashed metadata. Memory addresses for files having the metadata are saved at respective hashed indexed locations. The system enables rapid searching for files containing the metadata without employing a separate table containing the metadata itself.

Embodiments of the invention are applicable to computer memory management systems in general. As one example, embodiments are particularly applicable to a portable, hand-held modular system in which controller, memory and application modules can be connected together in various configurations.

Figure 1:
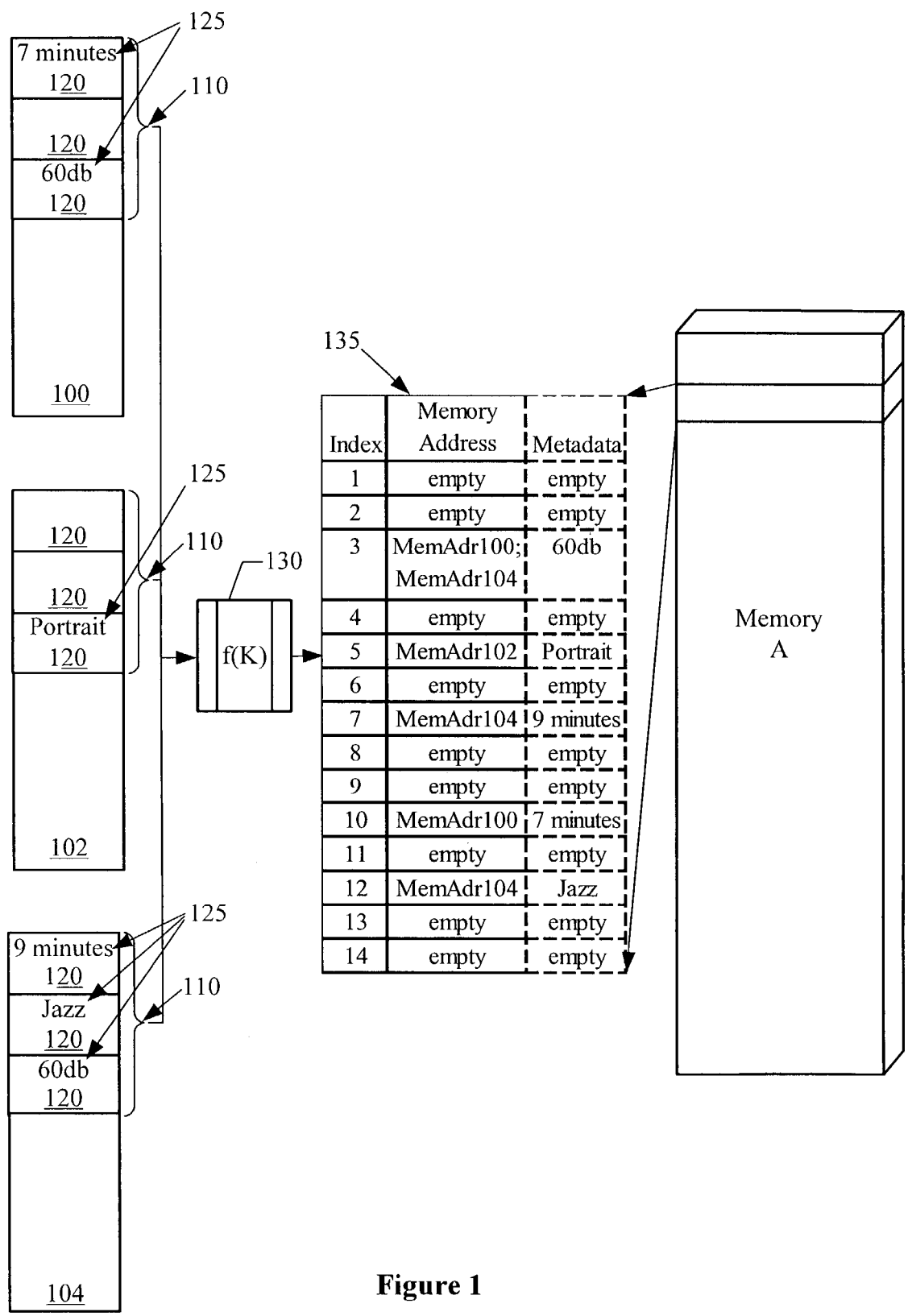
FIG. 1 is a block diagram of an embodiment of a hash table with both an index representing metadata in files, and the memory addresses of the files.

FIG. 1 illustrates an embodiment of a hash table having file memory locations representing files stored in a memory A. Three files (100, 102, 104) are represented, each having an interface 110 including metadata fields 120. At least some of the metadata fields 120 contain metadata 125. A hash function is shown that is used to transform the metadata 125 into a numbered index location of a hash table 135. The memory address for the file associated with the metadata is saved at the index location to facilitate later searching and retrieval. By way of example, the third file 204 contains the metadata "60 db" in a metadata field 120. The memory address for the file 104 (MemAdr104) is saved at index location 3 in the hash table 135 after transformation of the text "60 db" by hash function f(K) into "3." Similarly, the first file 100 contains the same "60 db" in a metadata field 120. Its memory location (MemAdr100) is saved at the same index location 3 of the hash table 135.

The hash function f(K) 130 is selected to produce a uniform scattering of metadata transformations across the numbered index of the hash table. Consequently, the function will depend on the variation of metadata values permitted by a designer of the system. Hash functions in general are well-known in the art. The size of hash table 135 will depend on the number of index locations used by the hash function f(K)130 and on the number of memory address locations to be saved in the table.

The hash table 135 can either be saved to both memories A and B, or to only one memory. Preferably, the table 135 is replicated to both memories to facilitate data recovery if one of the memories goes bad. Or, the hash table 135 can be broken up into several different tables corresponding to different file interfaces to shorten tables and speed up searching. The hash table 135 can also contain other information in addition to memory file locations. For example, to reduce collisions caused by the hash function 130 transforming different metadata to the same index location, both memory addresses and their associated metadata 125 can be stored in the hash table 135. In this manner, the metadata stored in the hash table 135 would be compared to the metadata input into the hash function prior to transformation, to confirm the accuracy of the transformation. Also, all metadata 125 need not be presented to the hash function 130 to build the hash table 135. Some metadata fields 120 may be reserved for proper execution of the file, such as recommended buffer sizing, encryption method identification, or synced tempo codes.

Figure 2:
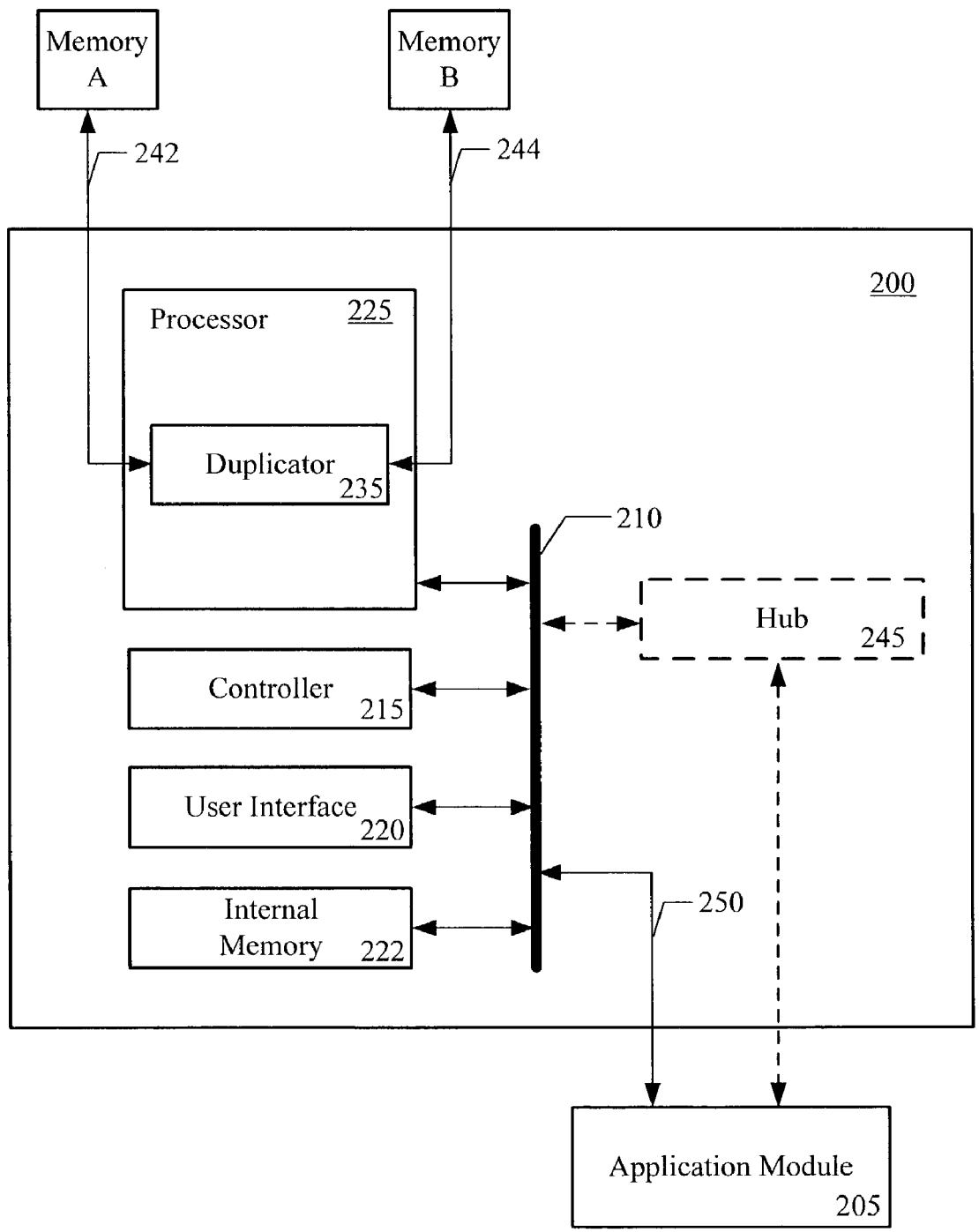
FIG. 2 is a block diagram of an embodiment of redundant memories connected to a processor for managing a hash table and associated files.

FIG. 2 illustrates an embodiments of a modular system with an implementation of a controller module 200 used to manage the receipt and storage of files along with associated hash table entries. The controller module 200, which can be referred to as a Compact Unlimited Library (CuL) controller, is shown in communication with memories A and B and an application module 205. Controller module 200 comprises a data bus 210 connected to a controller 215, a user interface 220, an internal memory 222, and a processor 225. The processor 225 and controller 215 may be integrated into a single device. Similarly, the internal memory 222 may be integrated onto a single chip with either the processor 225 or controller 215, or both.

The processor 225 also comprises a duplicator 235. 235 enables direct duplication of application data between memory A and memory B, without the use of other external devices such as a PC (personal computer), when a new memory is installed. The duplicator 235 also communicates through the data bus 210 with the user interface 220 to provide information to a user regarding duplication efforts. Duplicator 235 may be implemented in firmware, or with a software controlled general purpose DSP (digital signal processor). The data bus 210 is illustrated with electrically conductive paths between the processor 225, controller 215, user interface 220, and internal memory 222. Other signal transport mechanisms, such as an optical bus, may also be used.

Memories A and B are shown in direct communication with processor 225 along lines 242 and 244, respectively. Alternately, they could communicate with processor 225 through the data bus 210, utilizing a data protocol with an addressing scheme that is managed by the processor 225 and controller 215 to distinguish between the two memories.

In an alternative embodiment, a hub 245 is provided in the controller module 200 to enable its use with the application module 205 and additional application modules, if desired. The data bus 210 communicates with the application module 205 via the hub 245, and data path 250 would be omitted. A wireless scheme utilizing Blue-tooth™ or other wireless technology could also be provided for the data path between the controller module 200, memories A and B, and the application 205.

Figure 3:
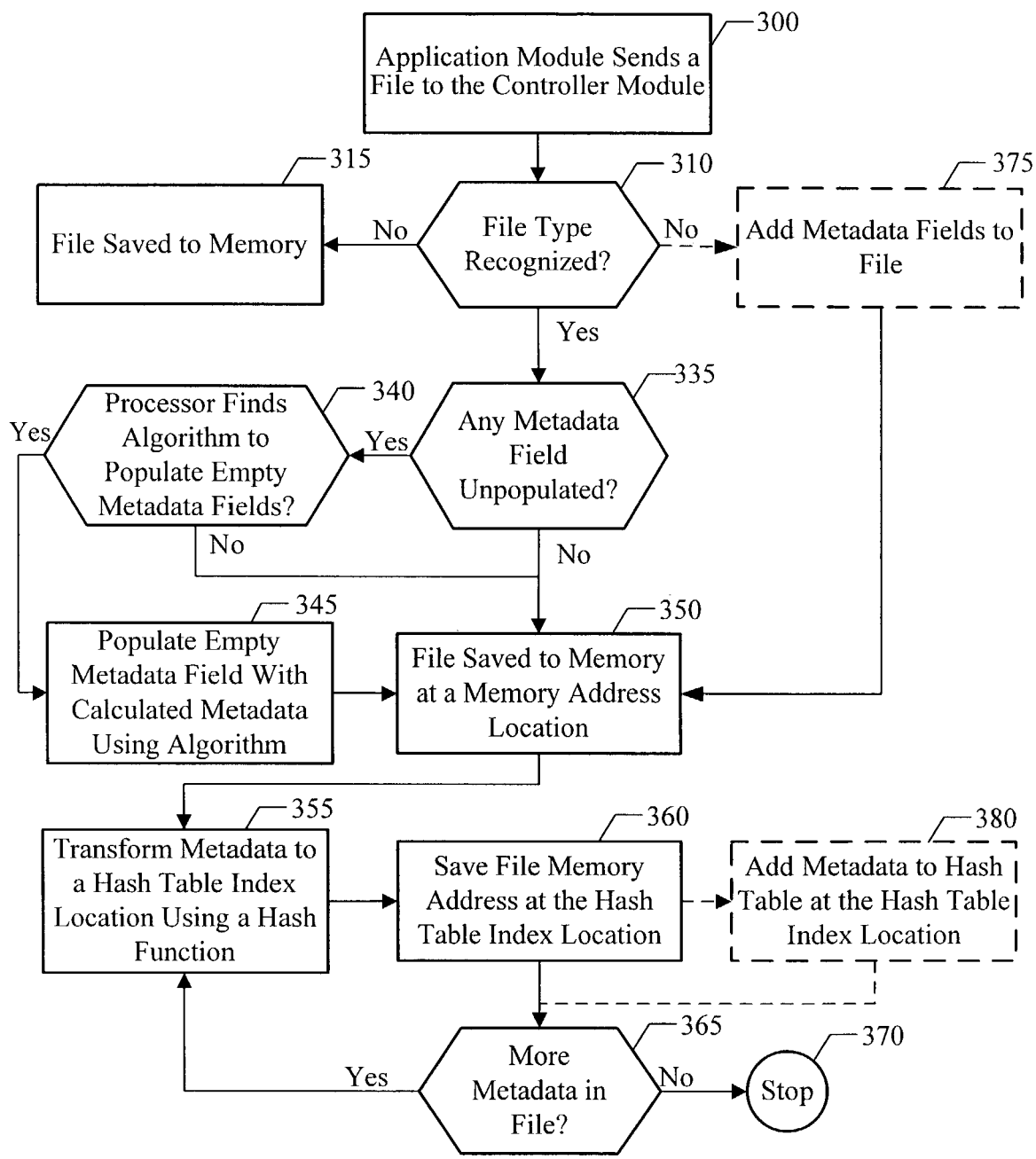
FIG. 3 is a flow diagram of an embodiment showing the use of a hash table to store memory addresses.

FIG. 3 illustrates a flow diagram of an embodiment for storing memory addresses in a hash table that is stored either in internal memory 222 or memories A and B. The application module 205 sends a file to the controller module 200 (block 300) and the processor 225 attempts to recognize the file type by examining its interface (block 310). If the file type is unrecognizable, the controller module 200 cannot recover usable metadata for later searching. Preferably, the file is saved to memories A and B (block 315) for possible use by the application module. If the processor recognizes the file type 310, it looks for unpopulated metadata fields within the files interface (block 335). Either all metadata fields are populated and the processor saves the file to memory at a memory address location (block 350) or at least one is unpopulated and the processor 225 attempts to locate an algorithm assigned to the empty metadata fields to fill them (block 340). The processor searches either a list of algorithms contained in memory or other metadata fields which contain the assigned algorithm. Preferably, the list of algorithms is contained in an internal memory accessible by the processor. Or, the list of algorithms may be saved in memories A and B to reduce the memory capacity requirement for the internal memory and to provide for redundancy in the event of a memory failure. Not all metadata fields for a given file type will have algorithms assigned to them. For example, no algorithm would exist for metadata fields identifying names, titles, or other information not implicitly contained in the file itself. If, however, the metadata field is provided with an assigned algorithm in internal memory, it uses the algorithm to generate metadata (block 345) for the field. In the example of an MP3 file having an unpopulated metadata field representing bass content, the algorithm would apply a low pass filter to file to integrate an indication of bass data for the field. If the empty metadata field indicates song length or voice type (male/female), the processor would attempt to locate an algorithm to calculate the song length and voice type.

The file is saved to memories A and B along with its calculated metadata (block 350) at an available memory address, and the address is forwarded to internal memory for temporary storage. The processor transforms metadata from the metadata field in the file to a hash table index location using a hash function (block 355), and the file's memory address is retrieved from internal memory to be stored at the calculated index location (blocks 360). The metadata in each metadata field in the file is presented in turn to the hash function to generate respective index locations for saving the file's memory address (blocks 365, 355, 360). After all metadata fields are examined, the process is stopped (block 370). In one embodiment, the metadata is also added to the hash table at the hash table index location (block 380). Also, if the file type is not recognized (block 310), metadata fields can be added to the file (block 375) so that at least some data may be provided to a user during a subsequent search. For example, the added metadata fields may include an application module serial number for indicating the file's origin, a metadata field indicating the existence of a read error, or any other metadata field desired by the designer to facilitate organization and storage of the file. The added metadata fields are then saved with the file to memories A and B (block 350).

The generic files described herein may consist of standardized or proprietary files in combination with populated metadata fields. Examples include audio WAV files, JPEG (Joint Photographic Experts Group) files and MPEG (Moving Picture Experts Group) files. Other standardized or proprietary files may be used as well. Metadata fields 120 and controller module 200 algorithms may be suitably modified.

Figure 4:
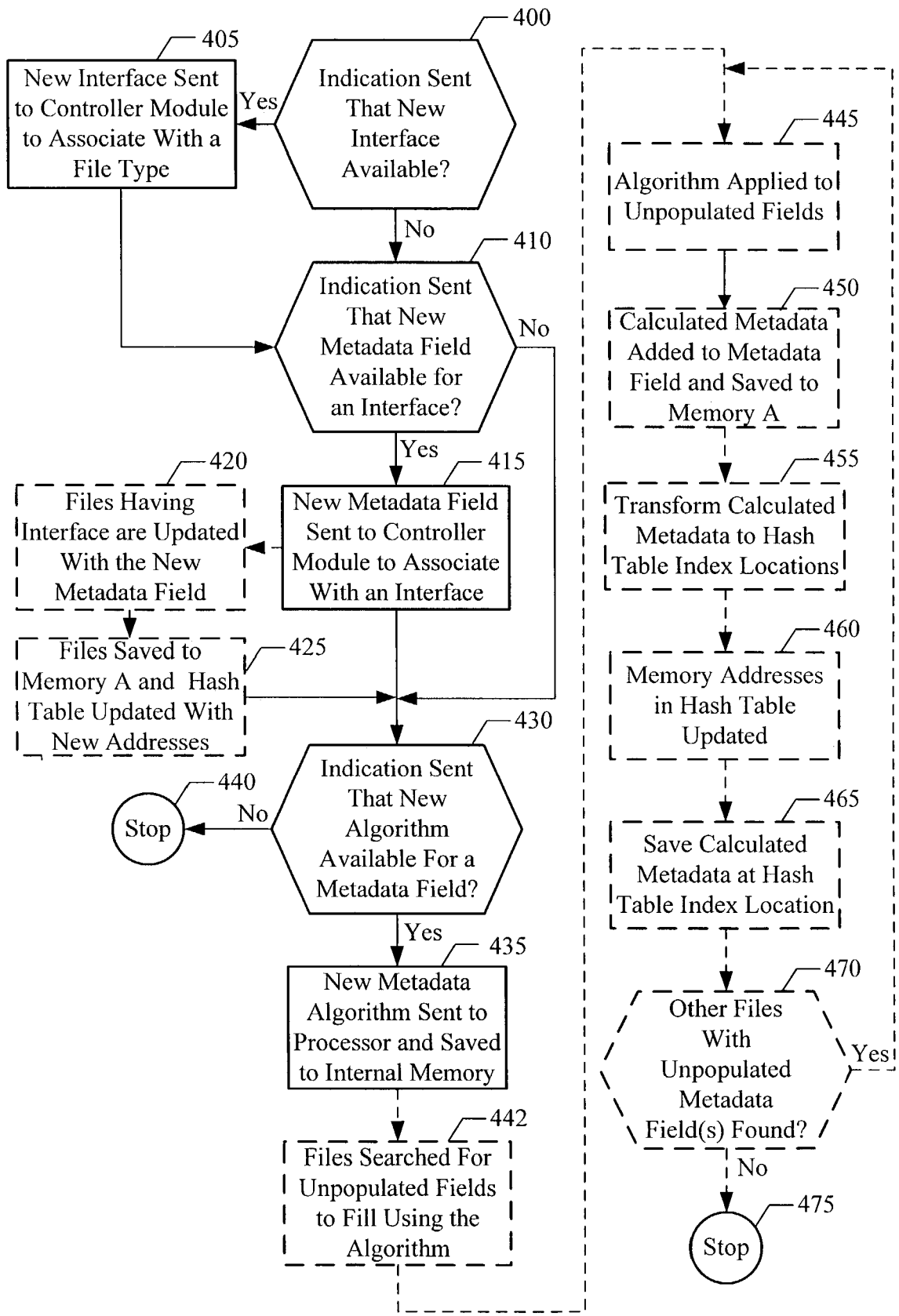
FIG. 4 is a flow diagram of an embodiment of a method for updating a controller module with new metadata fields.

In the operation of one embodiment shown in FIG. 4, the application module 205 updates the controller module 200 with newly available interfaces 110, metadata fields 120 and algorithms. The application module sends an indication that a new interface 110 is available (block 400), and sends the new interface 110 to the controller module 200 to associate with a file type (block 405). If an indication is also sent that a new metadata field 120 is available for an interface (block 410), the field is sent and the processor is updated (block 415). Optionally, the memory A can be searched for files having the interface, and such files updated with the new metadata field (block 420). The hash table 135 is updated with the new memory addresses as the files are saved along with the new fields, to memory A (block 425). If the application module 205 sends an indication that a new algorithm is available for a metadata field 120 (block 430), the algorithm is sent to the processor 225 and saved to internal memory 222 (block 435). The algorithm is assigned with the metadata field for use by the processor. Otherwise, the process is stopped (block 440).

In one embodiment, the processor 225 attempts to backfill non-populated metadata fields 120 using the newly available algorithms. The processor 225 searches memory A for metadata fields 120 assigned to the new algorithms to fill (block 442), and each new algorithm is applied (block 445). The calculated metadata 125 for each file is added to the appropriate metadata field 120, the files are saved to memory A (block 450), and their memory addresses are sent to internal memory for temporary storage. The calculated metadata 125 is also transformed into hash table index locations using the hash function f(K) (block 455), and the memory addresses for the files are transferred from internal memory to update the hash table (block 460) for each respective file. The calculated metadata can also be saved at the hash table index location (block 465). The process continues until all file interfaces have been searched for the new algorithms' applicability (blocks 470, 475).

Rather than the application module sending an indication that new interfaces, metadata fields and/or algorithms are available (blocks 400, 410), the controller module 200 can request such an update. Also, the interface and metadata field updates can come from a source other than the application module 205, such as a newly installed memory, a PC, an internet connection through the controller module 200, or some other device capable of updating the controller module 200. The algorithms can also be saved in memories A and/or B rather than internal memory 222.

Figure 5:
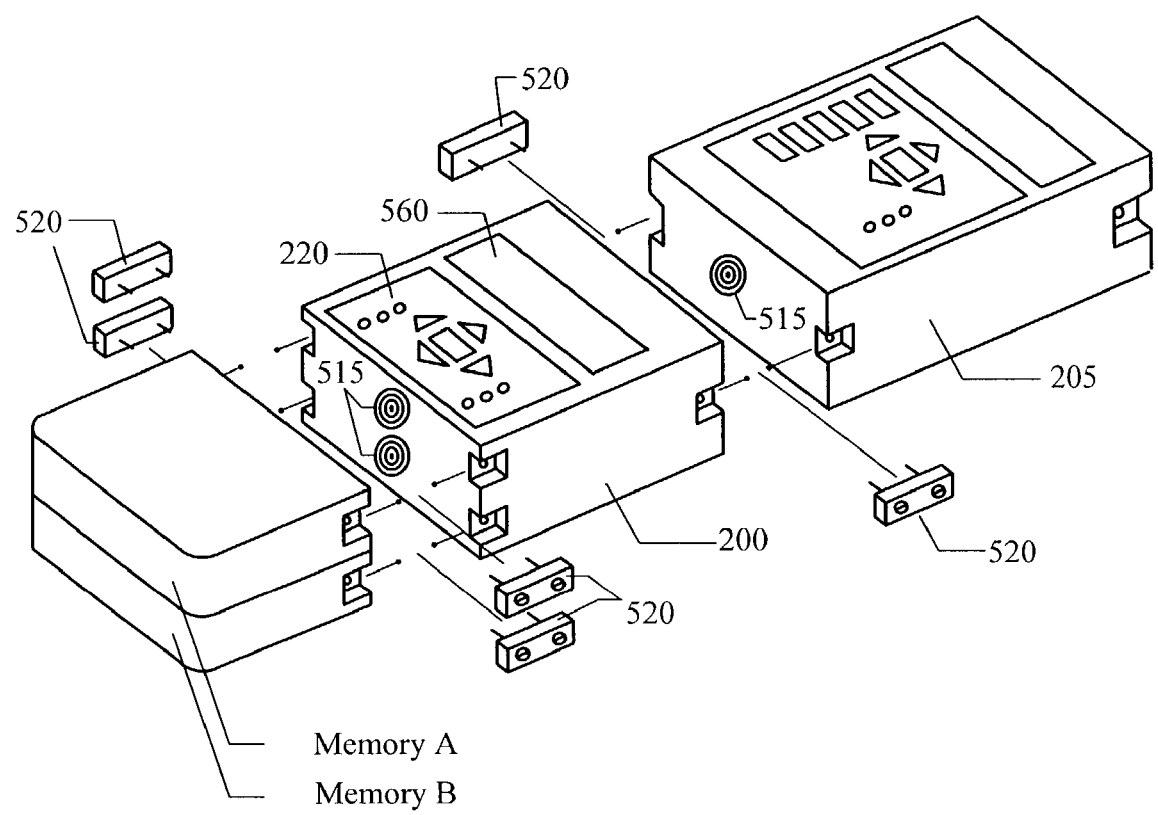
FIG. 5 is an exploded perspective view illustrating a portable electronic device with a modular redundant memory system in which embodiments may be used to advantage.

While embodiments of the invention are applicable to multiple memory systems in general, they are also useful for portable handheld modular consumer electronic products such as that shown in FIG. 5. Such a modular system enables a controller, such as that illustrated in FIG. 1, and multiple memories to be packaged together by the consumer with whichever application modules the consumer desires. In FIG. 5, the controller module 200 is shown aligned for electrical and mechanical connection with the application module 205 through an electrical connector 515 in the application module 205 and a complementary, opposed connector (not visible) in the controller module 200, and mechanical connectors 520. The controller module 200 manages files sent between the application module 205 and memories A, B.

The application module 205 shown in FIGS. 1 and 5 may be any portable electronic consumer application such as a video/still image player or reviewer, a PDA, a digital still or video camera, or an MP3 player. It can also be connected in turn to additional application modules through electrical and mechanical connectors similar to those shown. In such a case, the controller module 200 distinguishes between the different application modules by a data addressing scheme.

The illustrated electrical connector 515 has four concentric electrical contacts, providing two data paths and two power paths between the modules 200 and 205. Many different connection schemes can be envisioned. In the embodiment of FIG. 5, the connectors for adjacent modules are unisex in nature and spring-biased to extend slightly outward from their respective modules, providing a secure electrical contact when brought in contact with each other and held in place with mechanical connectors 520.

Memories A and B are shown aligned for electrical connection with the controller module 200 through a pair of electrical connectors 515 in the controller module, and a complementary pair of electrical connectors (not visible) in the memories, one for each memory. Each memory can be individually replaced if it goes bad, and a new memory installed. The electrical connectors 515 between the controller and memory modules correspond to the connector lines 242 and 244 between the processor 225 and memories A and B of FIG. 2, while the electrical connectors 515 between the controller and application modules correspond to connector line 150.

We claim:

1. A memory management system, comprising:
   an index location in a hash table representing metadata; and
   a file memory address saved at said index location;

wherein said hash table is searchable by a processor by entering metadata into a hash function to transform the metadata into said index location where said memory address is stored.

2. The memory management system of claim 1, further comprising:
a file saved in a first memory at said memory address, said memory in communication with a processor.

3. The memory management system of claim 2, wherein the file comprises a file interface having metadata in a metadata field.

4. The memory management system of claim 1, wherein a processor is programmed with the hash function to transform said metadata to said index location.

5. The memory management system of claim 2, further comprising:
a second memory in communication with said processor, said second memory having a replicated copy of said file to provide redundancy in case of first memory failure.

6. The memory management system of claim 5, further comprising:
a data bus in communication with said processor;
a first data path removed from said data bus connecting said first memory to said processor; and
a second data path removed from said data bus connecting said second memory to said processor.

7. The memory management system of claim 6, further comprising:
a hub in communication with said data bus to provide said files to said processor.

8. The memory management system of claim 1, further comprising:
an internal memory in communication with said processor and storing an algorithm for generating calculated metadata for said metadata field.

9. The memory management system of claim 2, further comprising:
a replicated copy of said hash table in said second memory to provide redundancy in case of first memory failure.

10. A memory management method, comprising:
saving a file in a memory at a memory address using a processor, said file having metadata in a metadata field;
transforming said metadata into an index location in a hash table; and
saving said memory address at said index location;
wherein said hash table is searchable by the processor to locate said file in said memory.

11. The memory management method of claim 10, further comprising:
saving said metadata at said index location.

12. The memory management method of claim 10, further comprising:
calculating metadata using said processor to populate an empty metadata field in said file.

13. The memory management method of claim 10, further comprising sending said file from an application module to a controller module, to be saved by said controller module at said memory address.

* * * * *